United States Patent
Pentheroudakis

[11] 3,935,574
[45] Jan. 27, 1976

[54] SIGNAL SOURCE POSITION-DETERMINING PROCESS

[75] Inventor: Panajiotis S. Pentheroudakis, Glendale, Calif.

[73] Assignee: The United States of America as represented by the Secretary of the Navy, Washington, D.C.

[22] Filed: Apr. 15, 1974

[21] Appl. No.: 460,870

[52] U.S. Cl. .......................... 343/113 R; 235/150.26
[51] Int. Cl.² .......................................... G01S 3/48
[58] Field of Search ................ 343/113 R, 100 AP; 235/150.26

[56] References Cited
UNITED STATES PATENTS

| | | | |
|---|---|---|---|
| 3,120,000 | 1/1964 | Wilmotte | 343/113 R |
| 3,500,414 | 3/1970 | Woerrlein | 343/113 R |

*Primary Examiner*—Richard A. Farley
*Assistant Examiner*—Richard E. Berger
*Attorney, Agent, or Firm*—R. S. Sciascia; P. N. Critchlow

[57] ABSTRACT

A signal source position is determined using an angle-measuring, interferometer system employing a longitudinal antenna array having a baseline length greater than the signal wavelength. The long, multi-lambda ($n\lambda$) baseline produces ambiguous phase measurement ( ). Thus, the true angular position or bearing could correspond either to $\phi$, or $\phi \pm 360°$, or $\phi \pm 2 \cdot 360°$, $-\phi \pm (n-1)360°$, or $\phi - n \cdot 360°$. Ambiguities are resolved by the longitudinal array angular motion relative to the signal source and by phase tracking the signal during the relative movement. To determine the true signal position, ($2n$) different software solutions for signal position are set up to process the $2n$ different angular data produced by each phase measurement ($\phi$). The "Lobe Tracking" procedure (there are $n$-number of data lobes in a ($n\lambda$) array) which is achieved by phase tracking provides the means of matching the $n$-different angular data produced by the phase measurement ($\phi$) to the $n$-different solutions set-up. From the n-different solutions set-up for signal position, only one will converge to the true signal position and the rest will diverge. The convergence or divergence depends on matching the vehicles position translation to the angular position change relative to the signal source. The solution elimination process is set up by certain solution conveyance criteria. Also the elimination process is enhanced by solution rejection based on unacceptability of angular data or lobe. Since lobe tracking matches the angular data produced by the measurement to the solution, unacceptability of data constitutes rejection of the solution.

10 Claims, 14 Drawing Figures

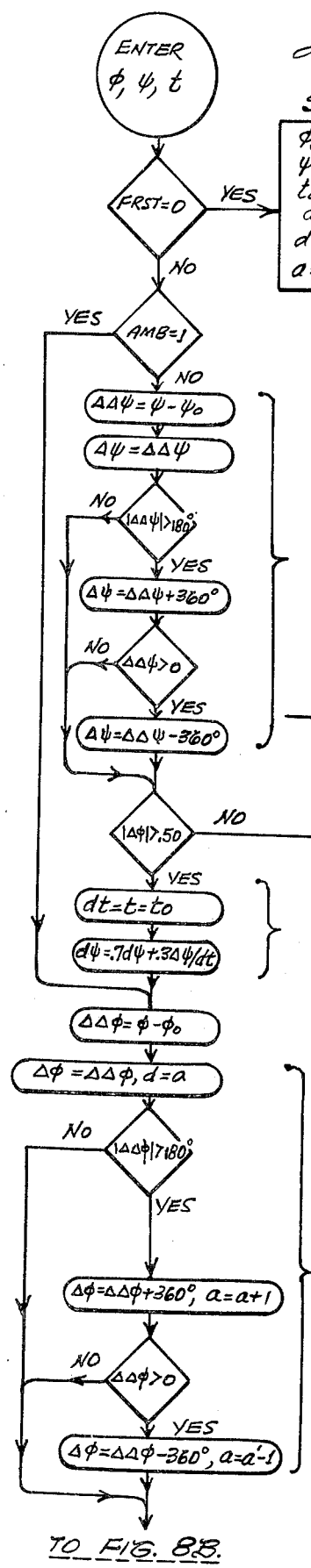

FIG. 8A.

NEW ITERATION
- $\phi$ = PHASE MEASUREMENT
- $\psi$ = ARRAY HEADING (TO NORTH)
- $t$ = TIME

FLAG FRST = 0 1ST ITERATION
= 1 SUBSEQUENT ITERATION.

$\phi_0, \psi_0, t_0$ = PREVIOUS ITERATION VALUES FOR PHASE HEADING & TIME $a$: LOBE CONSTANT
$d\psi$: SMOOTHED HEADING CHANGE RATE.
$d\phi$: SMOOTHED PHASE CHANGE RATE.
FRL: RIGHT-LEFT FLAG  1 RIGHT
                    -1 LEFT
                     0 DON'T KNOW
CNT: CONVERGE COUNT
K: SOLUTION NUMBER
n: ARRAY # OF LAMBDAS.
V(K): 1 SOLUTION K ACCEPTABLE
      0  "       " REJECTED
SS(K): CONVERGENCE PARAMETERS
SS2(K): FOR SOLUTION K $\Delta\psi$ ARRAY HEADING CHANGE COMPENSATED FOR DISCONTINUITIES SUCH AS THE POINT 0° TO 360°

IF HEADING CHANGE IS LESS THAN .5° THIS ITERATION IS DROPPED.

$d\psi$ = SMOOTHED HEADING CHANGE ITERATIVE FILTER.

$\Delta\phi$ = PHASE CHANGE COMPENSATED FOR DISCONTINUITY POINTS AT TRANSITION POINTS BETWEEN LOBES.

$a$: LOBE FACTOR UPDATE.

TO FIG. 8B.

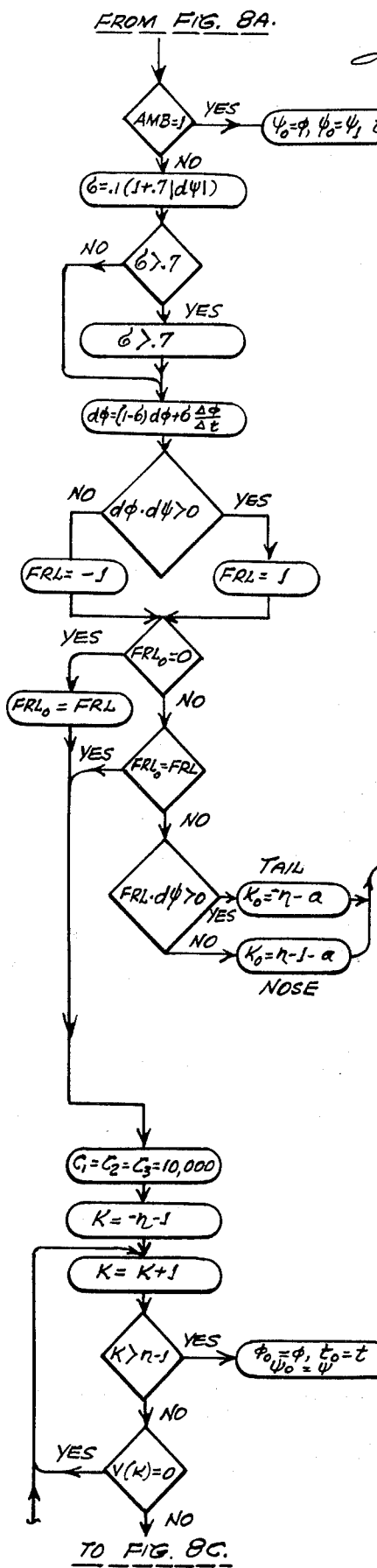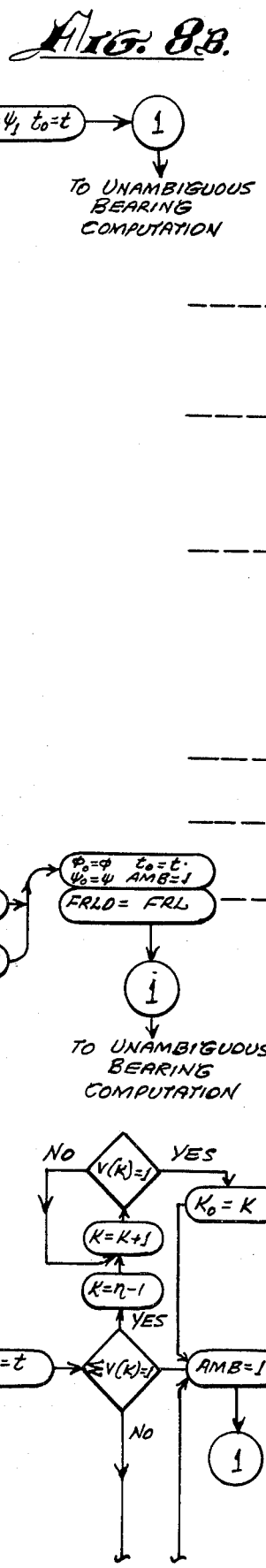

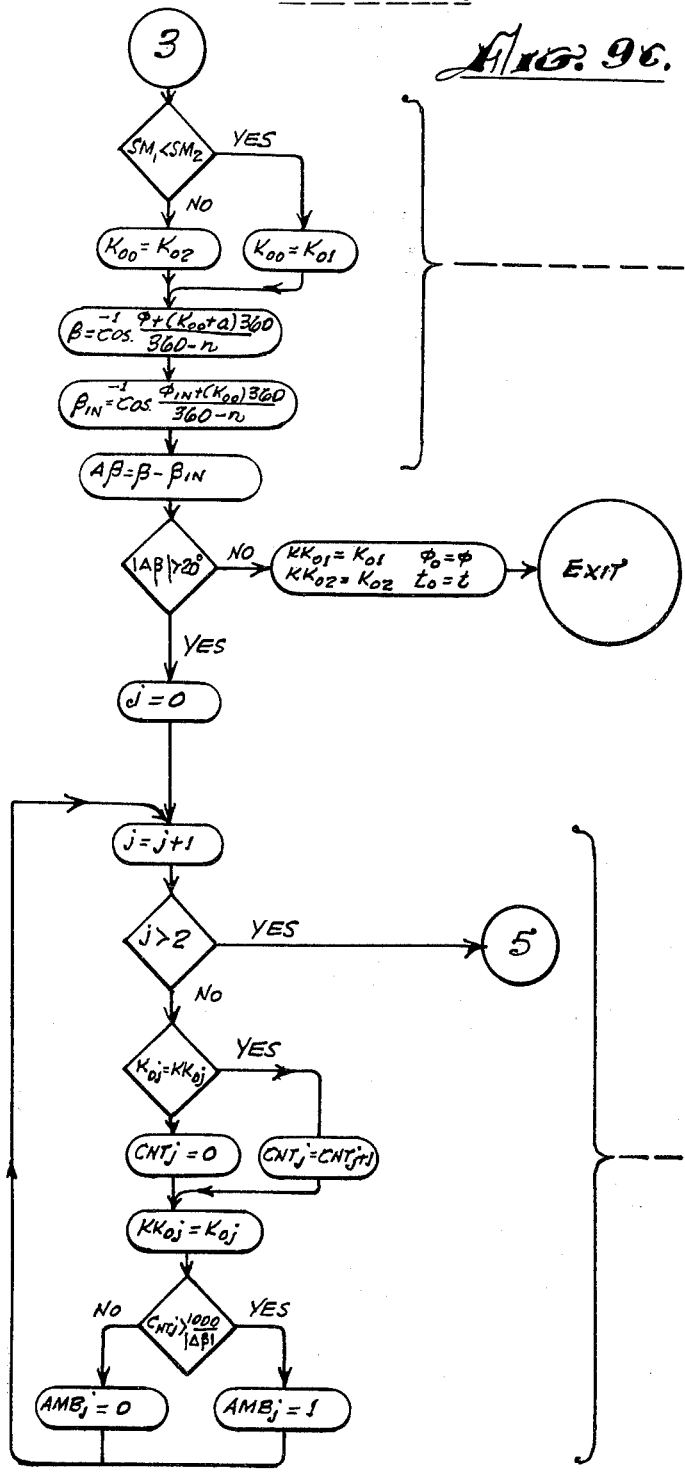

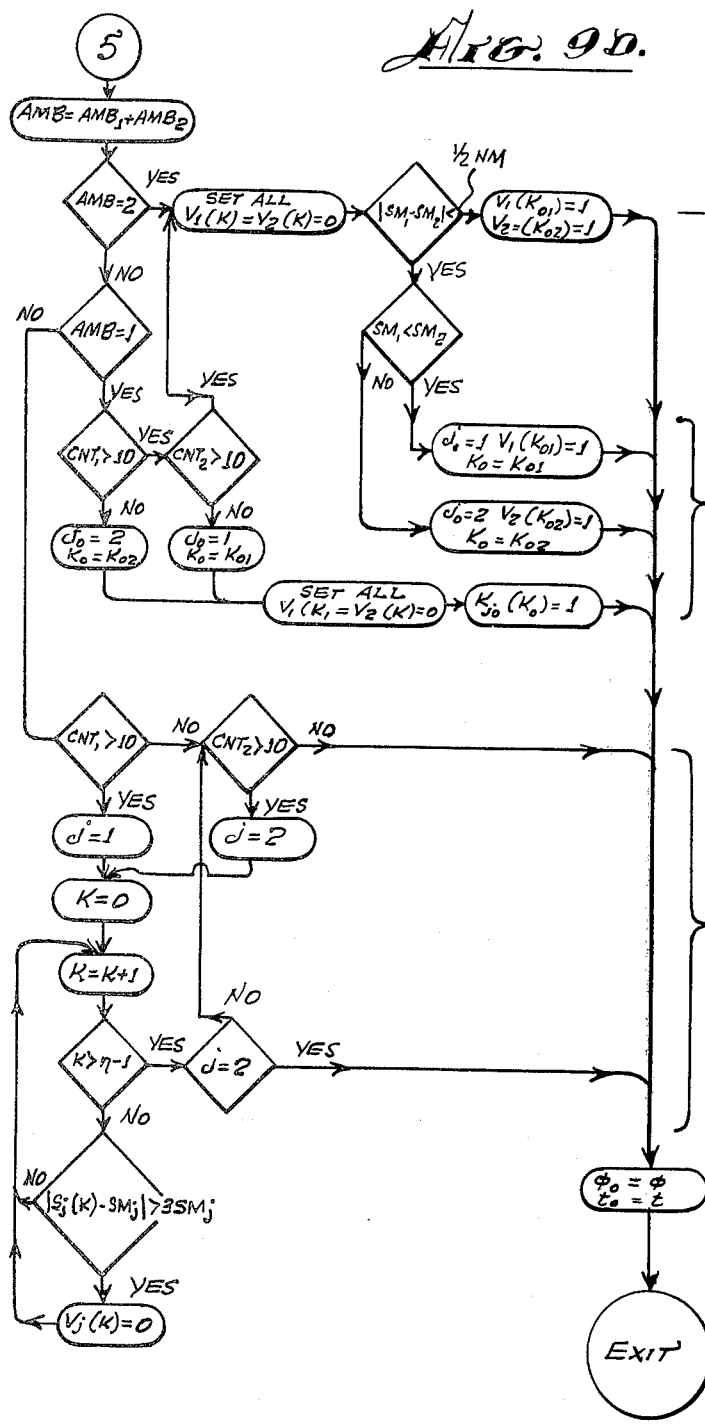

SIGNAL SOURCE POSITION-DETERMINING PROCESS

BACKGROUND OF THE INVENTION

The present invention relates to signal-source position-determining systems and, in particular, to interferometer systems that employ a multi-lambda, longitudinal antenna array which inherently produces position ambiguities that must be resolved.

The invention will be described primarily by considering its use or applicability in so-called 'Sonobuoys Reference Systems' of the type presently used to resolve airborne ASW problems in which an aircraft flying over the ocean is attempting to detect an invisible submarine operating below the water surface. One of the most common sensors used in such exercises is provided by sonobuoys capable of detecting sounds from underwater targets and relaying them to the aircraft by way of its radio transmitter. Half of the ASW problem thus involves the location of the underwater target relative to a group of sonobuoys. The other half, with which the present invention is directly concerned, involves the location of the sonobuoys relative to the aircraft. Obviously, the accurate location of the sonobuoy relative to the aircraft is needed to enable location of the invisible target. The Sonobuoy Reference System (SRS) can be considered as navigational equipment since its primary purpose is to locate the position of an aircraft relative to a field of drifting sonobuoys. However, in a broader sense, the present invention can be considered as relating generally to the job of locating a signal-generating target of any type or utility. For emphasis, it again is to be noted that the descriptive use of the SRS example is illustrative rather than restrictive.

Accurate, fast, SRS systems are needed and considerable efforts have been devoted to their development. The need becomes apparent when it is recognized that the original splashpoint of the sonobuoy rarely is known accurately. Also, the sonobuoys may drift at rates up to several knots throughout their operating life. A simple solution to the problem can be achieved if the aircraft can be tactically maneuvered so as to fly directly over the buoy at a low altitude. In some situations, this technique, known as an OTPI (on top position indication) technique, can be employed. However, the accuracy of visual OTPI is an inverse function of altitude and, as will be recognized, it also is highly dependent upon the observer's skill and experience. Because of such difficulties, more sophisticated and useful SRS systems incorporate angle-measuring equipment (AME) capable of measuring the angle from the axis of the aircraft to the sonobuoy at, for example, $t_1$ and again at $t_2$. By process of triangulation, the location of the aircraft relative to the sonobuoy can be determined. Such a process can be performed at any operating altitude and also it can be used with sonobuoys that are offset from the flight path.

The system of the present invention is of the type which employs the angle measuring equipment and, more specifically, angle measuring equipment which operates on the principle of an interferometer. Characteristically, interferometer systems used for this purpose generally employ at least one pair of antennas mounted on the aircraft and spaced one from the other a particular longitudinal distance defined as their baseline length. Obviously, if the longitudinal baseline of this antenna array is normal to the direction of arrival of a C-W signal from a sonobuoy target, then both antennas will receive the signal at the same time. Consequently, the signals arriving at the antennas will be in phase. However, if the sonobuoy is not located on the normal to the baseline, the signal will arrive at one of the antennas ahead of the others adn there will be a phase difference. By measuring this phase difference ($\phi$) it is possible to determine the angular displacement of the sonobuoy.

A difficulty experienced with the use of such systems is that if the baseline of the array is greater than one half the wavelength of the signal source, the phase measurements of the interferometer can be ambiguous because any single phase measurement can represent more than one angle of arrival. The reason for the ambiguity is because the phase detector of the system cannot determine how many cycles have occurred between the signal's time of arrival at the two antennas. For example, a phase difference of thirty degrees will appear to be the same as the phase difference of 30° plus 360° at the output of the detector. This ambiguity is present in all arrays having a baseline longer than one half the wavelength of the signal. Such arrays usually are referred to as multi-lambda ($n\lambda$) arrays, the term lambda representing the wavelength of the signal. Such ambiguity, however, is not present in a one half lambda baseline because, in this instance, only 180 electrical degrees separate the arrays and there is no possibility of two angular directions providing the same phase measurement.

Although the foregoing considerations obviously point to the use of the shorter baseline arrays, there is a further problem in that the shorter arrays provide relatively inaccurate results. Consequently, the situation is one in which the shorter arrays are unambiguous but relatively inaccurate whereas the longer arrays are relatively accurate but ambiguous.

This particular difficulty, of course, has been recognized in the implementation of SRS systems presently in use and, as would be expected, various techniques are used in an effort to remove the ambiguity while retaining the accuracy. One such technique employs multi-array configurations including both one half lambda and multi-lambda arrays as well as other arrays intermediate in length between these two. Ambiguities in the multi-lambda baselines are removed by sequentially processing the signal angle of arrival data to progressively remove the ambiguity from the shorter to the longer baselines. Usually, the ambiguity of the intermediate baseline arrays is removed from the one half lambda array data and the ambiguity of the long baseline array is subsequently removed from the intermediate data. In a more recent development (Lockheed-Cubic SRS System) the approach differs to the extent that a priori sonobuoy position data is utilized in the ambiguity removal of various multi-lambda arrays. When the sonobuoy position uncertainty is too great, a one half lambda AOA data is utilized until such time as the sonobuoy position estimate is improved sufficiently to permit the ambiguity to be resolved in the intermediate array data. Sequential processing of the intermediate array data subsequently improves the sonobuoy position estimate and provides a capability for resolving the ambiguities in the longer baseline data. As will be appreciated, the sequential processing of the longer baseline data provides the required accuracy in the sonobuoy position estimate.

One problem with these multi-array systems is that the ambiguity removal of data progressively from the shorter to the longer baselines is not always successful because of the excessive multipath errors and incorrectly resolved data which is generated and fed into the position solution algorithm which then yields an incorrect result. In the Lockheed-Cubic approach, longer baseline arrays can be utilized only when the sonobuoy position is known accurately enough through sonobuoy position estimates computed from sequential processing of the shorter and intermediate baseline data. Thus, one of the drawbacks to this approach is that the full potential of the angle of arrival data accuracy is not utilized immediately. Consequently, the time element involved in the sequential processing has undesirable tactical implications. Further, the success of the ambiguity removal remains somewhat sensitive to large multipath errors.

Another multi-array difficulty is the relative complexity, weight and size of its equipment or components. For example, one SRS multi-array system requires four longitudinal arrays as well as six transverse arrays the antennas of which feed into an SRS receiver-processor unit that includes an antenna switching matrix, an AME receiver, a computer interface unit and other electronic components such as local oscillator and calibration units. Obviously, it is desirable to provide a system in which the hardware requirements can be greatly reduced. Of equal importance, it is desirable to provide a system having the capability of producing relatively instantaneous results in contrast to the time-consuming, sequential processing required in the multi-array systems.

BRIEF SUMMARY AND OBJECTS OF THE INVENTION

An object of the present invention is to provide an interferometer type signal source position-locating system capable of directly resolving the ambiguity problem inherent in the use of relatively long, multi-lambda antenna arrays, the direct removal of the ambiguities eliminating the need of the shorter, unambiguous arrays. Another object related to the foregoing object is to provide a system of this type which has the capability of utilizing a single longitudinal antenna array having the longer or multi-lambda baseline.

Still another object is to provide a system of the type under consideration in which the true bearing of the signal source can be resolved in a relatively fast time without the need for sequential processing from shorter to longer baseline array data.

An additional object is to provide a system of the type under consideration in which the complexity, as well as the weight and cost of the required hardware is substantially reduced.

Other objects and their attendant advantages will become more apparent in the ensuing detailed description.

Briefly considered, the present process, instead of using the more conventional multi-array systems, utilizes only one array formed of a pair of antennas spaced longitudinally to provide a baseline length greater than the wavelength of the target signal. Other arrays, such as a transverse array to permit right and left resolutions, can be added if desired, although, as stated, only the single longitudinal array is required. For the processing of the phase measurements provided by the single multi-lambda array the present process generates all possible bearings ($2 \cdot n$) corresponding to the phase measurement ($\phi$) and processes each bearing through a different solution ($2n$ solutions). The matching of bearings is continuously performed by a lobe tracking process. Solution convergence criteria establish which solution (only one) converges and it is this one that provides the correct signal source position. The rest of the solutions are rejected as diverging. The so-called lobe tracking, as well as the phase tracking and other data derived from the tracking procedures will be described in detail in the subsequent description. It also might be noted at this point that bearing rejections can be based upon other criteria and that the present system contemplates the use of these other criteria to simplify the ultimate bearing resolution.

BRIEF DESCRIPTION OF THE DRAWINGS

The invention is illustrated in the accompanying drawings of which.

DETAILED DESCRIPTION OF THE INVENTION

Figure 1:
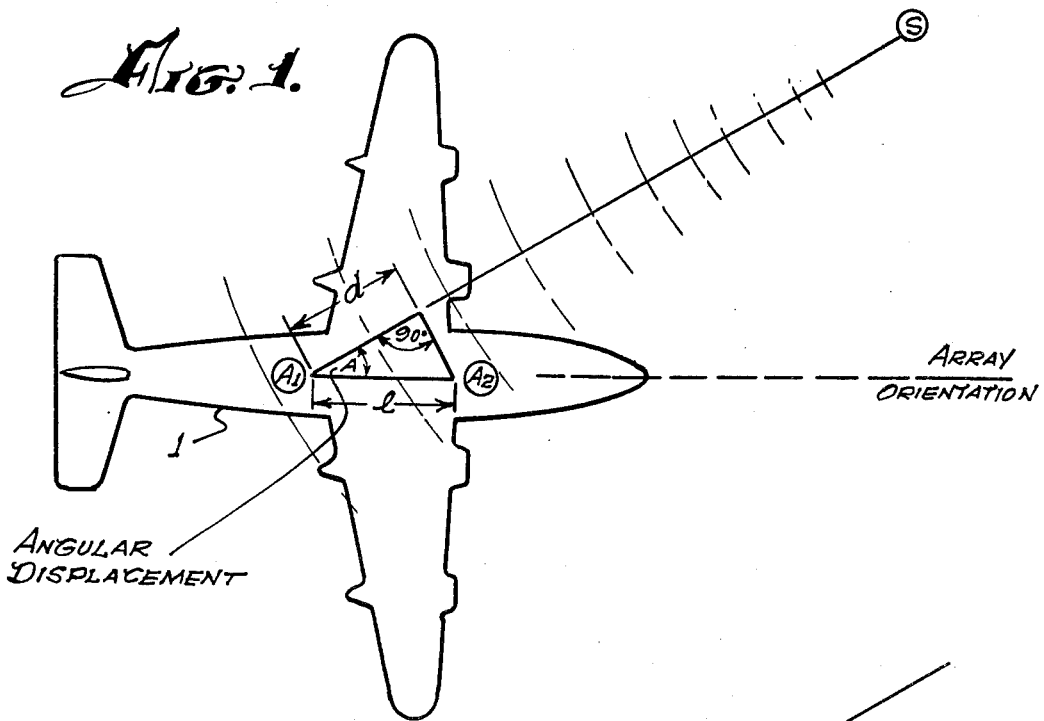
FIG. 1 schematically shows the multi-lambda array of the present invention mounted on an aircraft and tracking a signal-source target.
Figure 4:
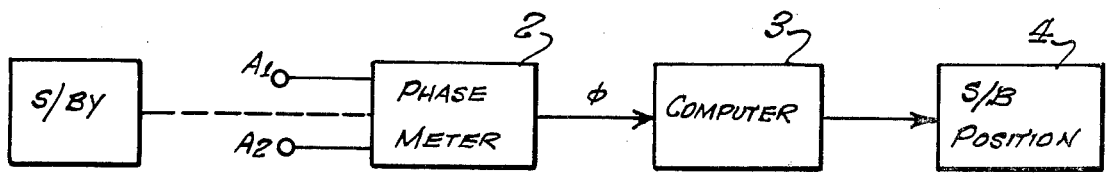
FIG. 4 is a block diagram of the system hardware.

Before considering the principal of operation of the present invention, it perhaps is advisable to briefly review the manner in which a conventional interferometer type angle measuring system operates. In this review reference can be made to FIGS. 1 and 4 of the drawings. FIG. 1 shows an array $A_1$–$A_2$ mounted on an aircraft 1, the array including a pair of antennas spaced longitudinally one from the other a distance L. As has been indicated, the fact that the present system requires only a single array, such as array $A_1$–$A_2$, is a significant feature of the present invention. Also mounted on the aircraft are certain electronic hardware components such as those schematically illustrated in FIG. 4. The signal derived from the sonobuoy of FIG. 4 is received by antennas $A_1$–$A_2$ and the phase difference of the antennas measured by phase meter 2. The meter output is, of course, a phase difference measurement $\phi$ which is applied to a computer 3 containing a particular software implementation used to resolve the input data into bearing or signal position data. A sonobuoy indicator 4 can be used to display this data.

Figures 2, 3:
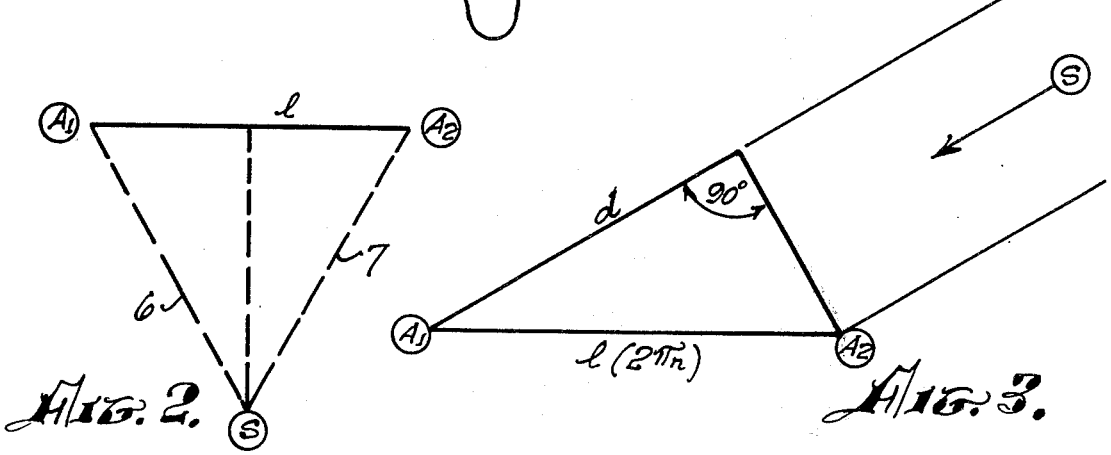
FIGS. 2 and 3 illustrate two different positions of the target signal relative to the multi-lambda array.

With regard to the phase difference measurements, it will be noted that if baseline 1 of the array is normal to the direction of the arrival of a continuous wave signal the signals received from each antenna $A_1$ and $A_2$ will be in phase one with the other. This fact is illustrated in FIG. 2 where it will be seen that sonobuoy produces a signal that arrives at the array in a direction normal to baseline L, the result being that sides 6 and 7 of the triangular plot are equal. Since the signal arrives at the antennas at identically the same time, the arriving signals are in phase. If, however, the signal source is not located on the normal to the baseline, the signal will arrive at one of the antennas ahead of the other. This fact is illustrated in FIG. 3. By measuring the phase difference with phase meter 2 it is possible to determine the signal source line-of-sight angular displacement relative to the antenna baseline.

Obviously then there will be certain relationship between phase difference and angular displacement which can be functionally expressed. However, before considering this relationship, certain terms used in the relationship should be defined. In particular, it should be noted that the array length (L) usually is expressed in the number of wavelengths or so-called ($\phi$). For example, the size of an array can be called one lambda if the physical spacing L produces a measurement of 360° phase difference when the signal is received from the direction of the array orientation. Similarly a 0.5λ length produces a 180° phase difference and a 2λ array produces a 720° (2·360°). The phase difference, of course, is expressed in electrical degrees.

The functional relationship of the phase measurement to the angular displacement is expressed using the right angle triangle relationship of FIG. 3 which, as already explained, shows the direction of arrival at antennas $A_1$ and $A_2$ of a single source S. With reference to this figure, the cosine law provides the following relationship:

$$\cos A = \frac{d}{L} \qquad \text{(Equation 1)}$$

in which A represents the signal source angular displacement, d represents the phase difference in degrees and L, of course, represents the array length also in degrees. The logic of this relationship is apparent by considering the fact that the ratio d/L progressively increases as the angular displacement is reduced by a relative movement of the signal source in a clockwise direction towards 0°. When angle A equals 0° the cosine of the angle = 1. Similarly, when angle A equals 90° the cosine of 90° = 0 since, as shown in FIG. 2, there is no phase difference at the antennas of the array.

The principle concern of the present invention is that of resolving ambiguities existing because of the use of multi-lambda arrays in which the array length L or baseline is greater than 360°. Although the reason for the ambiguities has been explained, it perhaps can be better understood by considering the following relationships. In the case of multi-lambda arrays, it is apparent that phase difference d can exceed 360° depending upon the signal source direction. However, a conventional phase-measuring device, such as a phase meter 2, measures only a fractional part of a 360° cycle or, in other words, it measures from 0° to 360°. Since the entire length d in degrees cannot be measured there are manifest ambiguities existing in the solution of equation 1. Assume, for example, that:

$d = \phi + 360° \cdot K$ where
$\phi$ = phase difference
K = number of cycles (1 cycle=360°)
and, if array length L is defined as
$L = 360° \cdot n$
where $n$ = number of lambdas then equation (1) can be modified to $$\cos A = \frac{\phi}{L} = \frac{\phi + 360 K}{n360} \qquad \text{(Eq. 2)}$$

Equation 2 demonstrates clearly the problem in defining cosA. The phase difference $\phi$ and the array length n are not sufficient to define cosA. The factor $k$ which is an integer, also needs to be determined. Consequently, for the cases in which $k$ is not defined, ambiguities exist since, for the same phase meter measurement, $\phi$ can correspond to several different angular displacements. By way of example:

for 1λ array ($n=1$) we obtain 2 solutions for A $$\cos A_1 = \frac{\phi}{360} \qquad 0 < \phi < 360$$
$$\cos A_2 = \frac{\phi - 360}{360} \qquad 0 < \phi < 360$$

for 2λ array ($n=2$) we obtain 4 solutions for A $$\cos A_0 = \frac{\phi + 0}{720} \qquad 0 < \phi < 360$$
$$\cos A_1 = \frac{\phi + 360}{720} \qquad 0 < \phi < 360$$
$$\cos A_{-1} = \frac{\phi - 360}{720} \qquad 0 < \phi < 360$$
$$\cos A_{-2} = \frac{\phi - 720}{720} \qquad 0 < \phi < 360$$

for 0.5λ array ($n=.5$) we obtain a unambiguous or unique solution for A $$\cos A_1 = \frac{\phi}{180} \qquad 0 < \phi < 180$$
$$\cos A_2 = \frac{\phi - 360}{180} \qquad 180 < \phi < 360$$

There is no ambiguity in the 0.5λ array since it readily can be determined simply by the phase meter reading which of the angular displacements represents the true bearing. If the reading is between 0° and 180°, the true bearing is the angle $A_1$ and, if the reading is greater than 180°, the true bearing is $A_2$. Another fact which can be noted at this point is that the 1λ array is ambiguous to the extent that it has two apparent or possible true bearings, while the 2λ array in which $n = 2$ has four possible bearing solutions.

It has been pointed out that prior art systems utilized the shorter baseline arrays, such as the 0.5λ array, because of their freedom from ambiguity but that, as compared with multi-lambda arrays, the shorter baselines provide relatively inaccurate bearing resolutions. The relative accuracy of the multi-lambda arrays can be demonstrated mathematically in the following manner:

Assuming that the phase meter measurement 100 can be measured with an accuracy of $d\phi$, the true measurement is $\phi_{true} = \phi - d\phi$ the error in establishing the cosA of the displacement angle for a 0.5λ array then is:

$$\cos A = \frac{\phi}{180} = \frac{\phi_T + d\phi}{180} = \frac{\phi_T}{180} + \frac{d\phi}{180} = \cos A_{TRUE} + \frac{d\phi}{180}$$

and $$\text{error} = \cos A - \cos A_{TRUE} = \frac{d\phi}{180}$$

similarly for a 9 2λ array $$\cos A = \frac{\phi + 360K}{360.2} = \frac{\phi_T + d\phi + 360K}{720} = \frac{\phi_T + 360K}{720} + \frac{d\phi}{720} = \cos A_{TRUE} + \frac{d\phi}{720}$$

and $$\text{error} = \cos A - \cos A_{TRUE} = \frac{d\phi}{720}$$

As shown, the same measurement error $d\phi$ introduces an error $(d\phi/180)$ in establishing cosA with a 0.5λ array and an error $(d\phi/720)$ in establishing cosA with a 2λ array. The 2λ error thus is 4 times smaller.

Summarizing, it should be apparent that an accurate determination of a true bearing requires the use of multi-lambda arrays although any methods for the determination also must be capable of establishing unique, unambiguous correspondence between the phase meter measurement ($\phi$) and the angular displacement (A). In turn, this ambiguity removal problem requires the determination of the factor K (Equation 2) this factor, as already pointed out, representing the portion of the phase measurement that cannot be recorded by the phase meter. Stated in another manner, this portion or factor K is an integer representing a number of cycles or, when considered with regard to azimuthal angular displacement, the number of so-called 'lobes'.

Figure 5:
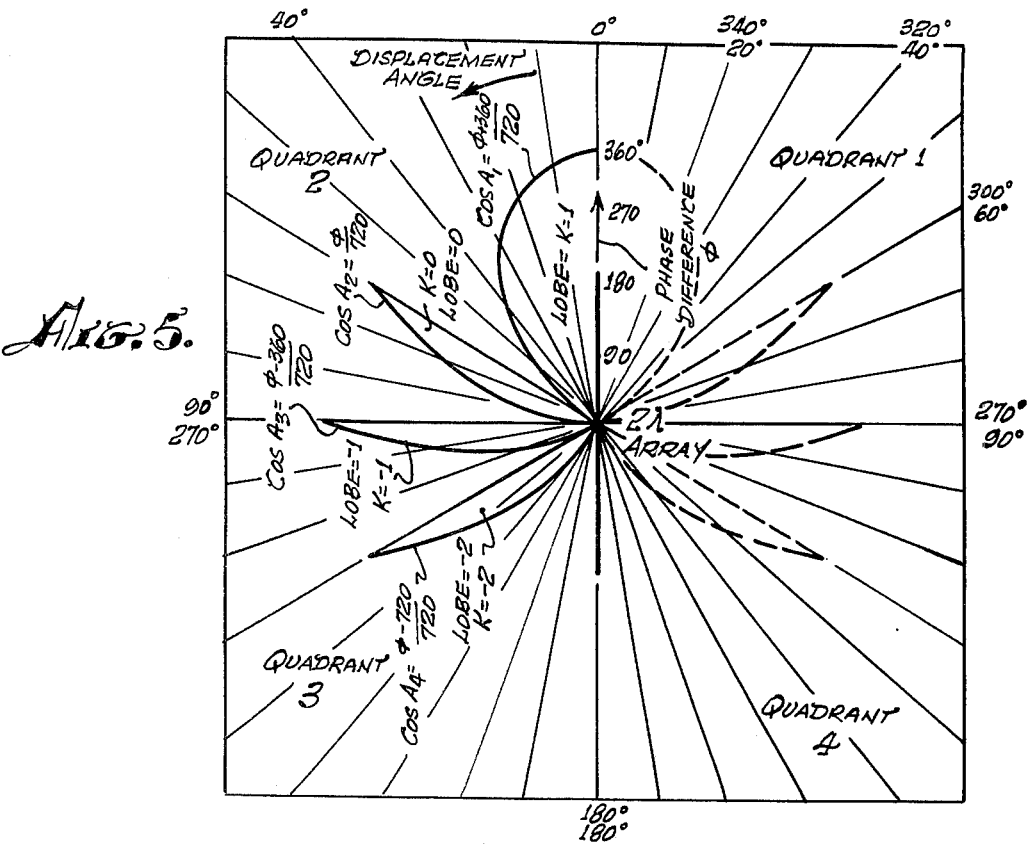
FIGS. 5 and 6 are compass rose plots showing the azimuthal phase rate of change lobes for $2\lambda$ and $1\lambda$ arrays respectively.

For further clarification of the term lobes reference can be made to FIG. 5 which represents a phase plot of a 2λ array as a function of signal source angular displacement. In other words, it can be considered in FIG. 5 that the 2λ array is stationary while the signal source or target is moved monotonically about the array from a dead-ahead 0° position clockwise throughout 360°. Of course, in a Sonobuoy Reference System, the relative movement, as a practical matter, would involve tactical maneuvers in which the array would be rotated about its azimuthal axis rather than there being a monotonic circling movement of the signal source which, as will be understood, is being employed primarily to simplify description.

Referring to FIG. 5, it will be noted that movement of the signal source position from 0° to 60° produces a decrease in the lobe=measurement from 360° to 0°. This complete 360° (electrical degrees) phase cycle presently is called a lobe and, for reasons which will become clear, it is designated by its corresponding value of factor K (equation 2) or, as shown in FIG. 5, this lobe can be identified as lobe =1 or =1. The next lobe shown in FIG. 5 is substantially thinner in angular size than lobe 1 since, as will be seen, a signal source position change from 60° to 90° produces a corresponding decrease in electrical phase from 360° to 0°. This second lobe is designated as lobe=0 or k=0. The logic of this designation will be discussed subsequently.

In a similar manner, lobe=−1, k=−1 and lobe=−2, k=−2 are formed in the third quadrant of FIG. 5. It will be noted that lobe −1 has a 30° angular width similar to lobe=0, while lobe=−2 has a 60° width comparable to lobe 1.

These lobes are of particular significance in permitting true bearing resolutions and, consequently, it is important to understand several characteristics of these lobes, as well as the manner in which they are established. More specifically, these lobes can be established for any particular array such as the illustrated 2λ array or other arrays, such as a 1λ, 1.5λ, 3λ etc. Lobes such as those shown in FIG. 5 and 6 are well known and the phase rate of change represented by the curves of the lobes thus are in the category of established, or, in other words, a priori knowledge.

Figure 6:
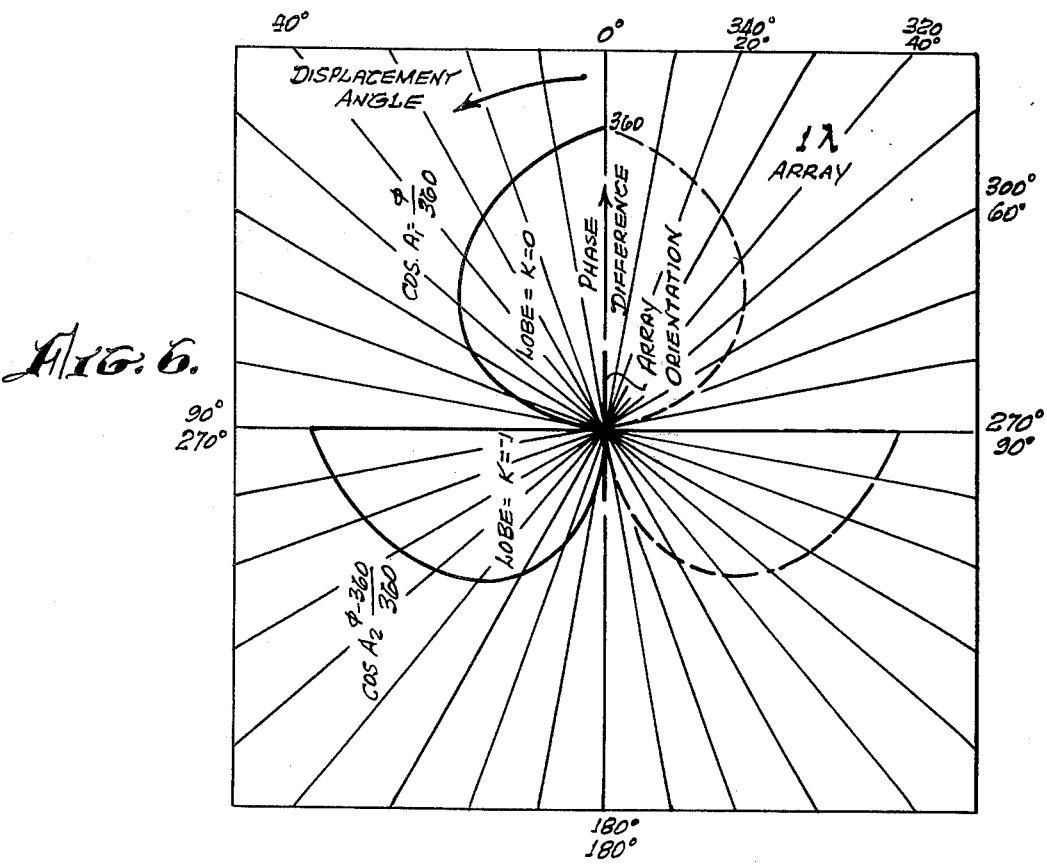

Another important characteristic to be noted in both FIGS. 5 and 6 is that there is an abrupt discontinuity between each of the lobes to the extent that lobe 1, by way of illustration, has a 0° phase difference at 60° azimuth, while lobe=0, has a 360° phase difference at 60° azimuth. In the present invention, these abrupt discontinuities in which the phase difference $\phi$ abruptly changes from 0° to 360° are utilized and their utilization provides one of the features of the present invention. Utilization is achieved by employing what can be termed 'lobe-tracking' in which, as will be explained, the discontinuities are tracked to provide essential data for matching bearing-solutions pairs. However, before describing the lobe-tracking concept and its role in determining the true bearing, it probably is desirable to consider other important aspects of the a priori data provided by these lobes.

First, the integers identifying each of the lobes can be considered with regard to equation 2 (supra) which functionally expresses relationship between phase difference and the angular displacement. For example, it has been noted that a 2λ array such as is represented in FIG. 5, has four possible solutions for angle A (FIG. 3). Thus, $$\cos A = \frac{\phi + 360K}{360n}$$

can provide 4 solutions depending entirely upon the value of k or, in other words, the cycle or lobe. Thus, if the displacement angle A is between 60° and 90°, $$\cos A_0 = \frac{\phi + 360°\cdot 0}{720} = \frac{\phi}{720}.$$

Similarly, $$\cos A_1 = \frac{\phi + 360°}{720}, \cos A_{-1} = \frac{\phi - 360°}{720} \text{ and } \cos A_{-2} = \frac{\phi - 720}{720}.$$

Thus, for every phase meter measurement $\phi$ there are 4 possible bearings or angles any one of which may be the true bearing. In other words, the same phase data provides four solutions which differ because of the lobing characteristics shown in FIG. 5. Each of the lobes therefore is characterized by the fact that the angular displacement applicable to that lobe has a special though different solution which, again, depends on the integer $k$.

The logic in identifying $k=0$ as lobe 0 is readily apparent from a brief mathematical consideration. If it be assumed that angular displacement $A=90°$, then $\cos 90°=0$. However, $\cos 90°=0$ is possible only if the phase difference ($\phi$) is 0 and lobe $k=0$. In other words the functional relationship is $$\frac{\phi + 360 \cdot 0}{720}$$

Similarly, if $a=60°$ then $$\cos A = \tfrac{1}{2} = \frac{360 + 360 \cdot 0}{720}.$$

L be 0 thus identifies that lobe in which the phase difference varies from 0° to 360° between azimuth variations in which A varies from 60° to 90°. Similarly, $A_1$ represents an angle or a bearing in lobe 1 (K=1) which varies between 60° and 0° azimuth for a phase difference variation of 360°. If $A_1=60°$ then $\cos 60°=\tfrac{1}{2}$ and, where $$k=1 \quad \cos 60° = \frac{0(\phi) + 360}{720} \cdot 1 \text{ or } \tfrac{1}{2}.$$

Also, if $A_1=0°$ which is the dead ahead position of FIG. 5, then $$\cos 0° = \frac{1 \cdot 360 + 360 \cdot 1}{720} \text{ or } 1.$$

The same considerations apply in the third quadrant in which $k=-1$ or $k=-2$. In view of the foregoing it will be appreciated that the integers identifying the four different lobes of FIG. 1 are mathematically and logically valid so that $\phi$ solutions for $A_o$, $A_1$, $A_{-1}$ and $A_{-2}$ provide valid bearing data if the phase measurement is applied to the particular equation representing each of these lobes.

The polar plot of FIG. 6 represents the lobes for a 1λ. This plot differs from the 2λ array in that the FIG. 6 plot has 2 instead of 4 lobes, each of the lobes having a azimuth change from 90° for a 360° phase change. This plot is included simply to show the applicability of the principles of the present invention to arrays other than to the 2λ arrays. However, since the same considerations apply equally to arrays other than the 2λ arrays, subsequent description will be with reference to the 2λ array.

In performing the process of the present invention, the initial step involves the establishment of the a priori lobe data such as that shown in FIG. 5 or 6. This step is significant since the ultimate resolution of the true bearing depends, in effect, upon a comparison or matching of the data measured by the phase meter with this a priori lobe data. The next step is to vary the attitude of the array relative to the signal source and, as will become apparent, this variation can be achieved by rotating the array or by moving linearly in a forward or rearward direction. Further, if desired, the attitude variations of the array can be achieved by other aircraft movements such as a tilting or rolling movement. In general, any relative movement between the array and the signal source is capable of providing monotonically varying changes azimuthal position or, in other words, in the displacement angle or bearing of the signal target relative to the array. Any such monotonic variations are capable of providing data to enable the true bearing to be determined. As the relative dispositions are varied, signals are received at phase meter 2 at varying time intervals and, of course, chronologically-successive phase measurements are produced by the meter. These phase measurements ($\phi$) are applied to computer 3 (FIG. 4) which utilized conventional hardware and software programs to provide the true bearing.

Functionally considered, the computer, or its equivalent, records and processes particular information derived from the successive phase measurements. In particular, the computer may make use of the following observations from the measurements:

a. It records the so-called abrupt discontinuities in the measurements. In this regard a sudden change from 0° to 360° or vice-versa signifies a change in lobe and the so-called lobe tracking technique of the present invention keeps count of the lobe changes to provide information helpful in establishing the signal source correct angular displacement;

b. It records whether the phase measurements increase or decrease. This increase or decrease helps to establish whether the signal source moves from quadrants (1, 2) to (3, 4) or vice-versa. Moving in one direction there will be a decrease in the phase measurements and moving in the opposite direction will produce an increase;

c. It determines the rate at which the phase measurement varies. This rate helps to establish under certain conditions the lobe that contains the correct signal source angular displacement.

Other information utilized by the computer includes the actual incremental, relative movement that produces the phase difference. For example, if the array is being rotated about its azimuthal axis, the rotational degree for each phase measurement is recorded. Stated in another manner, if the array were to be rotated 30° to produce a particular phase difference, the 30° rotation is recorded and utilized. If the relative movement is accomplished linearly rather than in a rotational manner, the forward or rearward travel is recorded and utilized.

As the array is moved relative to the target phase measurements are made continuously at frequent intervals so as to provide a reliably continuous phase rate of change curve. One reason for the repetitive or iterative sampling of the phase change is to minimize such errors as may be present in the measurements. These errors possibly can yield erroneous results particularly if the ultimate solution is based only on a few samplings. Most suitably, the phase measurements are processed into the computer through a so-called Kalman iterative filter which takes frequent samplings to statistically remove the errors present in the measurements. Kalman filters are well-known, commercially-available instruments which progressively filter out such errors as may be present. In other words, an error that may be present between a first and second measurement is reduced by noting and recording the error between the second and third measurement etc. The error parameter thus is progressively reduced statistically to within acceptable limits.

In performing the process of the present invention there are two rather distinct but related procedures for removing the measurement ambiguity and determining the true bearing. One of these procedures is applicable to a relatively simplified situation in which the antenna array can be rotated about its azimuthal axis, the azimuthal relative bearing of the target being varied by a known and recordable amount. In this simplified rotational situation each measured phase change is produced by a particular increment of rotational movement or measured azimuthal change. This rotational procedure, as will be described, provides a considerably simpler method but as will be appreciated, it is applicable only where relative rotation is physically possible. For example, it can be used and implemented for a Sonobuoy Reference System with the multi-lambda array mounted on a helicopter capable of being rotated about its central axis. The same applies if the array is stationary and can be manually rotated. It can also be implemented on a aircraft if it tactically is acceptable to have the aircraft fly an initial 360° maneuver.

In the following operational description, it is to be kept in mind that the phase meter coupled to the array is supplying phase measurements to the computer which is a special purpose computer having a suitable software program. During the rotational movement, measurements are taken chronologically for successive measured and recorded increments of rotational movements. The chronological frequency of the measurements should be adjusted to a rate that will allow proper lobe tracking. For example, if a 6λ array is utilized its thinner lobe will be 9.6°. Assuming that proper phase tracking requires at least 6 measurements in a lobe, sampling should be taken for every 1.6° change in azimuth. For an azimuth rotational rate of 3°/sec of the array platform, the measurement repetition rate should then be approximately 2 per second.

Figure 8C:
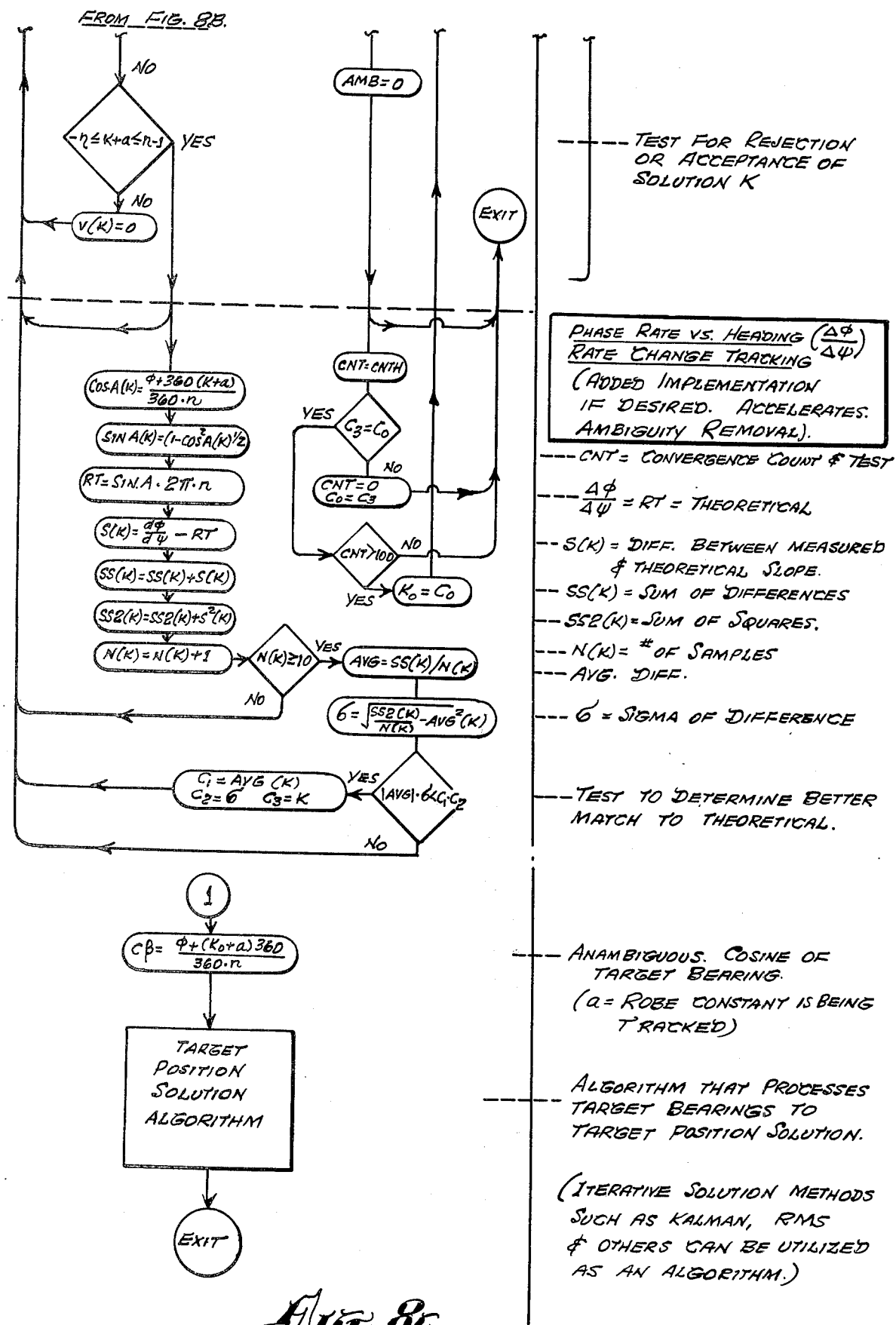
Figure 9A:
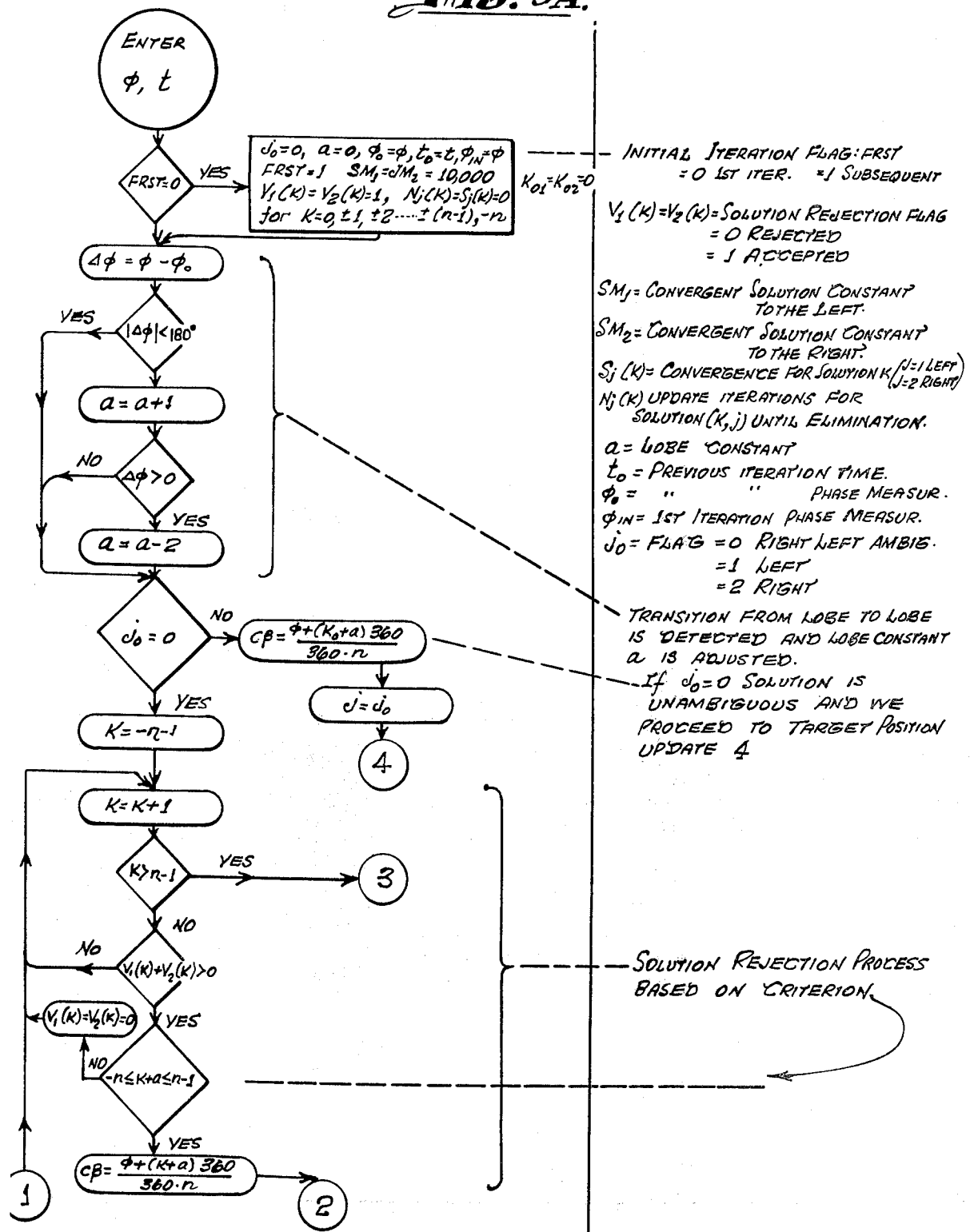
Figure 9B:
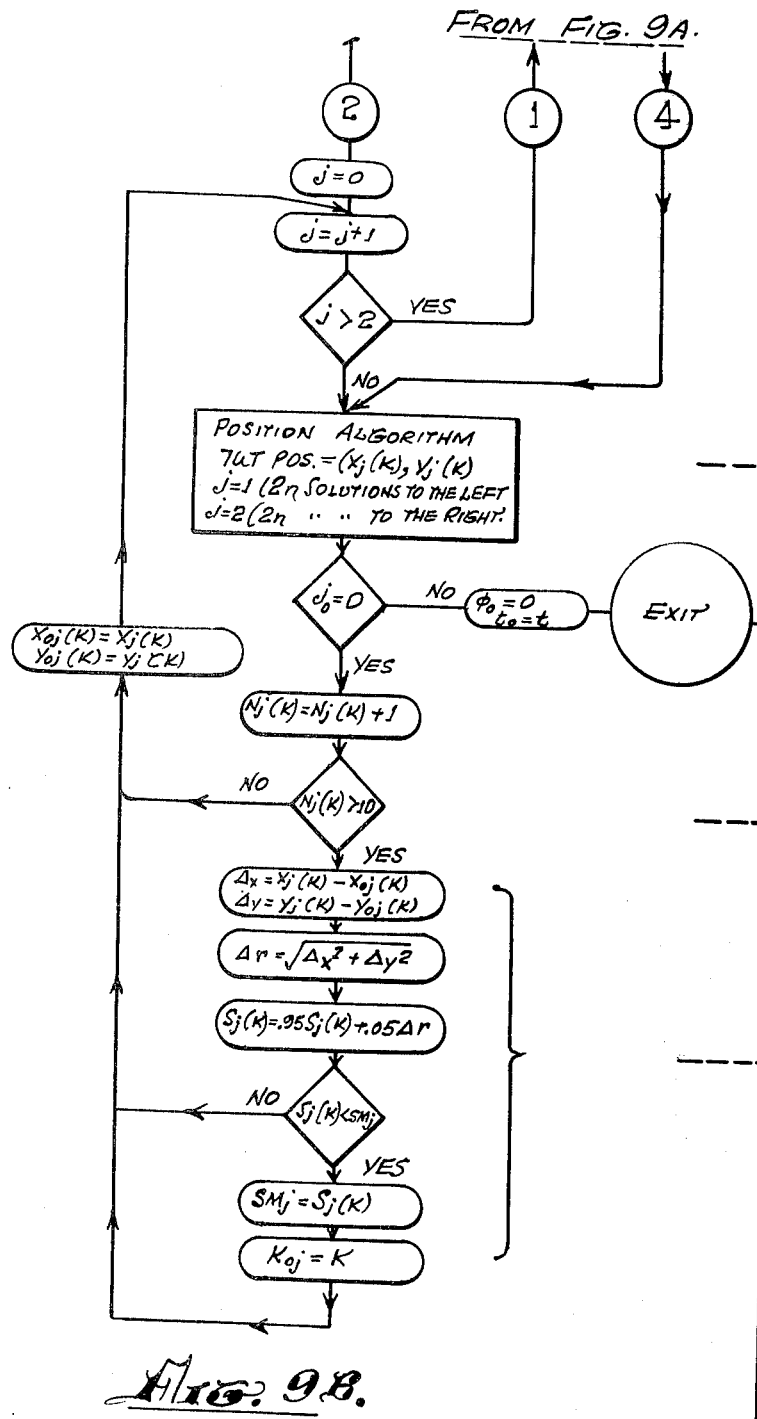

The software program that implements the ambiguity removal process for the rotational mode is provided in FIG. 8 A, B and C. The description which follows relates to the FIG. 8 software which provides in its left-hand column a flow chart for the basic computations and, in its right-hand column, a definition as well as an explanation of the terms and steps used in the computations. It is suggested that reference is made to FIG. 8 for such clarification as may be needed. The broad functional steps used in the computations are stated in the right-hand column. FIG. 9 has the same format as FIG. 8 and it also is intended to supplement subsequent description of the second operational mode which, as indicated, is concerned with tactical situation involving linear rather than rotational aircraft maneuvers.

The end result of the FIG. 8 program is to resolve the data ambiguity. The program sets up K possible solutions equal to the number of ambiguities in the array $(n\lambda)$; that is, it sets up K=2n solutions all of which are possible bearings corresponding to the phase measurement $\phi$. That is -

$$A(k) = \frac{\phi + 360K}{360n} \quad (k=0, \pm1, \pm2, ... \pm(n-1), -n) \quad (eq. 3)$$

Briefly considered, the featured 'lobe-tracking' part of this invention provides a process that defines which phase $(\phi + 360K)$ is to be processed through which solution. In other words, lobe tracking performs a matching process which is the matching of angular data to the solutions. For this purpose, the lobe tracking procedure generates a so-called lobe tracking constant $a$. This constant is initially set at zero. As the signal source bearing changes from lobe to lobe during the array rotational motion, a large change (abrupt discontinuity) in phase is detected and this change signifies a change in lobe. To utilize this constant a, criteria can be set so that, whenever a phase change occurs that is in absolute value greater than 180°, it signifies a change in lobe. For this to be true, however, the frequency of the phase measurements must be at least sufficiently proximatte to assure that phase changes greater than 180° do not occur. Using these criteria, whenever the change in phase in absolute value is less than 180°, it is apparent that the phase measurement data for chronologically-successive pair of measurements comes from the same lobe so that the lobe constant a is the same for each measurement of the pair. However, when there is a phase change greater than 180° and the measurement indicates a counter clockwise (CCW) 180° motion of the target relative to the array, the lobe constant a is decreased by 1, i.e., $\{a(t_i + 1) = a(t_i) - 1\}$. Whenever a phase change less than $-180°$ occurs (i.e., greater in negative value), which signifies CW target bearing motion, the lobe constant a is increased by 1, i.e., $a(t_1 + 1) = a(t_i) + 1$.

The current lobe constant thus represents the number of lobes or number of cycles to which the phase measurement has changed from its initial value. A negative value for $a$ represents CCW rotation of target bearing relative to the array and a positive value for $a$ represents CW rotation. Modifying the phase measurement of $\phi$ of Eq. 2 to a phase measurement $\phi + 360'a'$ can provide a representation of the total change the phase measurement undergoes during the processing, since, as will be appreciated, the application of $a$ adds or subtracts each previous 360° lobe excursion. In this manner, lobe tracking using the constant $a$ provides this consistency required in producing all feasible target bearings or, in other words, the matching of phase $(\phi + 360a + 360k)$ to the bearing solution K. The equation used in computing the bearings thus is modified to:

$$\cos A_{(k)} = \frac{\phi + 360a + 360k}{360n} \quad (eg. 4)$$

Another factor to be considered is that for a bearing solution to be acceptable $[A(k)=\cos\beta \leq 1]$ the numerator of Equation 4 has to be less than the denominator, that is:

$$|\phi + 360a + 360k| \leq 360n$$

or $$-n \leq a+k \leq n-1$$

If $(a+k)$ is not within these limits the bearing solution $k$ is rejected since it obviously cannot represent the true bearing of the target. By rotating the array and forcing the true target bearing to cross several lobes the lobe constant $a$ can change so that all except one $(a+k)$ can be rejected.

Physically no matter how much the array is rotated the values the lobe factor will not force the true solution to be rejected. For example assuming a 2λ array and further assuming that the true target bearing is at lobe K=1 and the 2λ array is being rotated clockwise (i.e., target bearing moving CCW), four solutions having a lobe factor $a=0$ are set: i.e.,

| solutions | k=1 | a+k=1 |
|---|---|---|
| | k=0 | a+k=0 |
| | k=−1 | a+k=−1 |
| | k=−2 | a+k=−2 |

Note that all $k$'s are within the range $-n \leq a+k \leq n-1$ or, for the 2λ array, $-2 \leq a+k \leq 1$.

However, when the target bearing in its CCW motion moves to lobe $k=0$, the lobe tracking factor is set to $a=-1$ and

| k=1 | a+k=0 |
|---|---|
| k=0 | a+k=−1 |
| k=−1 | a+k=−2 |
| k=−2 | a+k=−3 |

At this time the solution $k=-2$ is rejected since it does not meet the requirement of $-2 \leq k+a \leq 1$. Similarly when the target bearing moves to lobe $k=-1$, the lobe tracking factor becomes $a=-2$ and consequently the solution $k=-1$ is rejected. When the target bearing moves to lobe $k=-2$, the lobe tracking factor becomes $a=-3$ and the solution $k=0$ is rejected. If the array continues to rotate the target bearing will move to lobe $k=-2$ but on the right or opposite side of the aircraft. No abrupt change in phase is experienced during the transition and the lobe factor remains equal to $a=-3$. Continuing the CW array rotation from this point starts producing monotonically increasing phase measurements and, at the transition points for lobe to lobe, the detected phase change will force the lobe factor $a$ to start increasing again, i.e., $a=-3$ to $a=-2$ to $a=-1$, to $a=0$. Therefore all the values that $a$ assumes are 0, −1, −2, −3 and the solution $k=1$ always remains acceptable representing the true target bearing where it physically should be.

In the software implementation of FIG. 8, the consideration as to whether the target bearing is to the left or right of the aircraft also is incorporated. For positive azimuthal measurements (CW array rotation) monotonically decreasing phase measurements are produced if the target is on the right. These facts can be verified by reference to FIG. 5. Phase data discontinuities at the lobe transition points are removed by the compensating use of the lobe tracking constant. When the array is rotated CCW the opposite is true.

Also, in the software implementation the product of azimuthal change times the phase change is obtained. When the product is negative the target is on the left and when it is positive the target is on the right. A certain amount of filtering is introduced in producing the rate of change of the phase with azimuth. Filtering as presently intended implies the obtaining of an average of several samples. This average is essential to minimize the effects of measurement noise.

The right-left indication also can be utilized during the signal source transition from left to right or vice versa together with sensed array rotational motion (CW or CCW) to determine immediately whether the true target bearing belongs to a lobe adjacent to the nose of the array (lobe number $k=n-1$) or to one adjacent to the tail of the array (lobe number $K=-n$). Immediately upon determining a transition from right to left the array rotation is checked. If the array rotates CCW the true bearing belongs to the tail lobe; for CW array rotation the true bearing belongs to the nose lobe. For left to right transition, CW array rotation indicates the true bearing to belong to the tail lobe $(-n)$, while array CCW rotation indicates the true bearing to belong in the nose lobe $(n-1)$. Once the lobe ambiguity has been removed and left-right indication established, the processing for computing signal source position with unambiguous angular data can continue without any further need of the angular ambiguity removal process.

The ambiguity removal process described above utilizes only the lobe tracking process (tracking of the value of the lobe constant $a$). However, it does require for ambiguity removal purposes, up to a 180° azimuthal rotation prior to coming up with an unambiguous bearing. If phase rate tracking is used, this ambiguity removal process can be successfully carried out for smaller azimuthal rotations. In FIG. 8 the implementation of the phase rate tracking is provided. The process compares the measurement ratio of phase rate to azimuthal rate (i.e., produced by measurement data) to the theoretical ratio such as can be produced by the bearing equation $$\cos A_{(k)} = \frac{\phi + 360(k+a)}{360 \cdot n}.$$

Differentiation of this equation yields $$-\sin A_{(k)} \cdot dA = \frac{d\phi}{360 \cdot n}$$

$$\text{or } \frac{d\phi}{dA} \cong \frac{d\phi}{d} = -360 n \sin A_{(k)}$$

For the acceptable solutions $(-n \leq K+a \leq n-1)$, the corresponding $\sin A_{(k)}$ and $(d\phi/d\psi)$ theoretical ratios are computed. Subsequently the difference between the theoretical and measured ratios are produced. The statistical average of these differences if the (AVG) and standard deviation ($\sigma$) updated for each additional measurement. A suitable criteria for convergence is that the product $AVG_{(k)} \cdot \sigma K_k$ for the true solution provides the minimum product for at least 100 iterations. The 100 iterations should correspond to at least a 60° change in target azimuthal position change. Basically the implementation takes advantage of the fact that the phase rate to azimuthal rate is sinusoidal $$\left(\frac{d\phi}{d\phi} = 360 n \sin A_k\right)$$

and the matching of the theoretical to measured ratio occurs only in the correct lobe.

The foregoing description has been concerned primarily with the tactical situations in which the aircraft can be rotated relative to the target, or vice-versa. The following or second procedure is applicable to the previously-mentioned situations in which the array moving platform (aircraft) is or may be restricted tactically to a course with very little or no change in path (straight-line). In these situations the target azimuthal aspect varies only with the platform translational motion but, as will be appreciated, this azimuthal target aspect change is not measurable. As a result the phase rate to azimuth rate ratio can not be implemented. Also, the right-left indication with no array rotational motion can not be implemented. The lobe tracking process thus is the only one that can be employed to reject all possible bearings but the true one.

The implementation of this second procedure is provided in FIG. 9. The lobe tracking process updates the lobe constant $a$ at the transition points from lobe to lobe and the solutions that do not meet the criteria $-n \leq k+a \leq n-1$ are rejected. However as was mentioned earlier, the ambiguity removal in the bearing data based on lobe tracking alone may require a target azimuthal aspect change up to 180° which, with only a platform translational motion, can not be produced in a timely manner. In this procedure therefore $4n$ ($n$: array length) target position solutions are carried out for the processing of $4n$ corresponding bearings produced for the phase measurement $\phi$ ($2n$ solutions to the left and $2n$ solution to the right). Carrying out $4n$ position solutions has a two-fold beneficial effect: first, certain position convergence criteria can be utilized to progressively minimize the number of acceptable solutions, and, secondly, there is the fact that at the same time the unambiguous bearing measurement is determined, the target position solution also is available. The second effect significantly minimizes the computations.

The convergence criteria is implemented in the following manner. The target position solution migration for each update step is computed for each candidate solution. Similarly a weighted average migration for the last 20 iteration steps is implemented and the solutions with the minimum migration average among the candidate solutions to the right and left are determined. If the minimum computed migration corresponds to the same solution for a sufficient number of iterations the data ambiguity is considered to be resolved.

For a straight line course two unambiguous solutions (one to the right and one to the left) will result in that they represent mirror images of each other. The solution migration will be similar for both solutions and no decision can be made as to whether the true bearing lies on the right or left. Only change in path can resolve this right-left ambiguity. The amount of flight path changes required to resolve right-left ambiguity depends on whether convergence of the two mirror solutions has been established, a test is set-up to eliminate any candidate solution whenever its solution migration average is 4 times greater than the selected minimum migration solution.

As will be recognized, the foregoing descriptive material is predicated upon the special implementations of FIGS. 8 and 9. Thus, it will be noted that these Figures both include and broadly state the progressive steps used in resolving ambiguities for both the rotational and the translational modes of the array platform. Also, the Figures utilize the special criteria employed in the particular implementations such, for example, as the number of iterations or the minimum bearing change for each iteration. Obviously these criteria are special case factors utilized, for example, for the $2\lambda$ array.

Other arrays or other situations may involve different criteria which, of course, can be determined logically and with reference to the particular components being employed. Thus, FIGS. 8 and 9 are to be considered primarily as operative examples rather than broad functional characteristics. On the other hand, the examples include the broad techniques of lobe tracking and phase rate tracking, as well as right-left and nose-tail determinations all of which are significant features of the invention.

Reviewing and summarizing the resolution procedures, it first has been noted that the rotational procedure is considerably simplified in that azimuthal changes can be detected and computed in conjunction with the iteratively changing phase measurements. This ability to detect azimuthal change permits the described phase rate tracking which ultimately can be employed to eliminate ambiguities without requiring a full 180° azimuthal change in bearing. However, lobe tracking yields the true bearing when the azimuthal change is sufficient. Also, as has been described, right-left indications based upon increasing or decreasing phase measurements for CW or CCW rotations are readily obtainable. In addition, nose-tail aspects become apparent so as to narrow the eligible or candidate lobes.

When the array is mounted on an aircraft, or the like, azimuthal rotation usually is not practicable and since azimuthal changes cannot be measured directly, the determination of the true bearing cannot be predicated upon the phase-rate tracking. Instead, the software is provided with a plurality ($4n$) of solutions into which all angle of arrival (AOA) data is fed. For a $2\lambda$ array, there are four such solutions which as already noted, are:

$$\cos A_0 = \frac{\phi}{720}, \cos A_1 = \frac{\phi+360}{720}, \cos A_{-1} = \frac{\phi-360}{720}, \cos_{-2} = \frac{\phi-720}{720}.$$

In brief, all AOA data is fed into these solutions and the solution that converges becomes the true signal source position. To achieve convergence, the technique of lobe-tracking is needed or, as explained, the factor $a$ must be applied to compensate for lobe changes.

Figure 7:
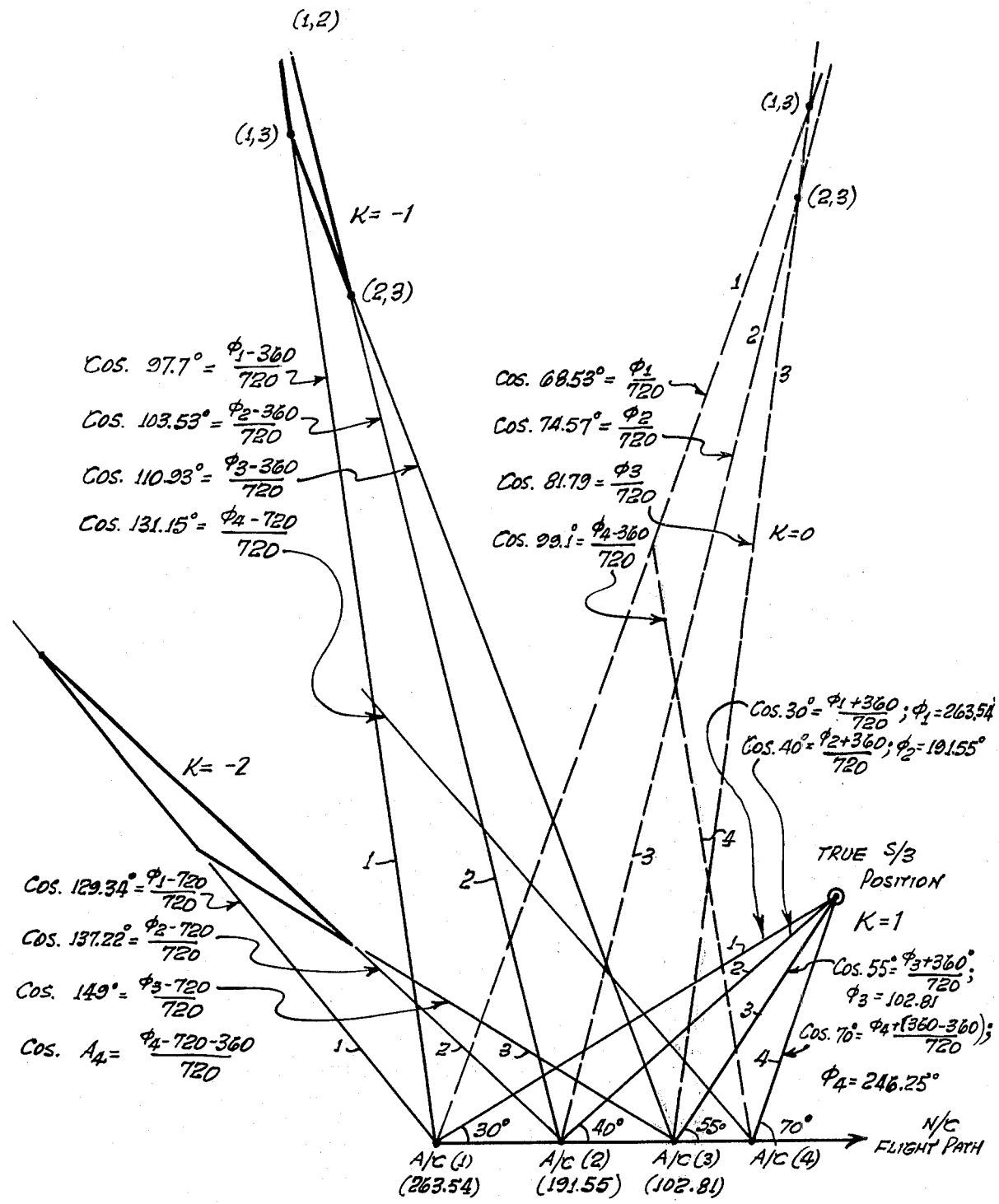
FIG. 7 is another plot illustrating certain convergence characteristics for four progressive angular dispositions of the signal-source target as an airborne array moves in a forward flight path, and FIGS. 8A, 8B, 8C, and 9A, 9B, 9C, 9D, schematically illustrate in flow-chart form two particular software implementations for the system.

The manner in which solution convergence is determined in the software implementation has been demonstrated. FIG. 7 has been incorporated to further illustrate and clarify the principle of convergence. As may be noted, FIG. 7 is a plot of bearing data obtained as an aircraft having a $2\lambda$ array moves translationally in a forward flight path through positions 1, 2, 3 and 4. However, the initial consideration of FIG. 7 will be with regard to positions 1, 2 and 3 since position 4 represents a special case which must alwasy be resolved but which presently is provided primarily to illustrate and explain the need for the lobe tracking. First it can be assumed that, at position points 1, 2 and 3, the phase meter of the system yields phase measurements $\phi1 = 263.54°$, $\phi2 = 191.55°$ and $\phi3 = 102.81°$. As already stated, the computer of the system first must determine all of the apparent bearings for each of these measurements and this step is accomplished by utilizing the previously-mentioned unique feature of applying the phase measurement data to each of the above solutions or equations. In other words, the four probable solutions are resolved as follows:

SOLUTION ($k=0$) $\cos A_1 = \dfrac{263.54}{720}$ ; $A_1 = 68.53°$ $\cos A_2 = \dfrac{191.55}{720}$ ; $A_2 = 74.57°$ $\cos A_3 = \dfrac{102.81}{720}$ ; $A_3 = 81.79°$ SOLUTION ($k=1$) $\cos A_1 = \dfrac{263.54+360}{720}$; $A_1 = 30°$ $\cos A_2 = \dfrac{191.55+360}{720}$; $A_2 = 40°$ $\cos A_3 = \dfrac{102.81+360}{720}$; $A_3 = 55°$ SOLUTION ($k=-1$) $\cos A_1 = \dfrac{263.54-360}{720}$; $A_1 = 97.7°$ $\cos A_2 = \dfrac{191.55-360}{720}$; $A_2 = 103.53°$ $\cos A_3 = \dfrac{102.81-360}{720}$; $A_3 = 110.93°$ SOLUTION ($k=-2$) $\cos A_1 = \dfrac{263.54-720}{720}$; $A_1 = 129.34°$ $\cos A_2 = \dfrac{191.55-720}{720}$; $A_2 = 137.22°$ $\cos A_3 = \dfrac{102.81-720}{720}$; $A_3 = 149°$ For solution ($k=0$), the sonobuoy bearings plotted from their respective aircraft positions 1, 2 and 3 of FIG. 7 provide three possible solutions for the sonobuoy position, these being identified in FIG. 7 as positions (1, 2), (2, 3) (1, 3) and these positions representing the intersections of bearings ($A_1$, $A_2$), ($A_2$, $A_3$), and ($A_1$, $A_3$) respectively.

The important point to be noted in the plot of FIG. 7 is that the solutions for $K=0$, $K=-1$ and $K=-2$ do not converge. In other words, the 3 points or positions, instead of converging, diverge since they migrate with time from (1, 2) to (2, 3) to (1, 3). However, the solutions for $K=1$, when plotted, provide 3 solution points which graphically coincide or converge and, consequently, this convergence provides the true sonobuoy position which does not migrate with time from one of the aircraft positions to another.

In actual practice, utilizing the special purpose computer of the system, the convergence of the different bearing solutions removes the ambiguity and provides the desired result which is the true sonobuoy position. Obviously, a computer cannot graphically plot the convergence. Instead, the computer utilizes the iterative approach that has been described.

In the foregoing example, the situation is considerably simplified to the extent that only three measurements are performed. In actual practice, accuracy of the convergence is assured by taking many more measurements during the periods that the aircraft travels from position 1 to position 3. The solution convergence then is substantiated statistically. The Kalman filter, by its very nature, processes the phase measurements rapidly with substantial continuity and the processing of each successive measurement is compared with the previous measurement to filter-out the error or, as stated, to reduce the error envelope so that convergence and divergence ultimately become apparent.

It is to be noted that the foregoing FIG. 7 example does not involve what has been identified as lobe-tracking since it does not necessarily utilize the information regarding the abrupt discontinuities between each of the lobes. However, lobe tracking is an essential part of the technique since correct resolution of the true bearing requires that the proper AOA date be applied to the proper solution and this propriety is assumed by utilizing the abrupt discontinuity data. To explain lobe tracking and its need, the fourth position (position 4) of FIG. 7 can be considered. The phase measurement ($\phi_4$) for this fourth position can be assumed to be 245.25°. Using this phase measurement of 246.25°, it first should be noted that if this phase measurement were fed into or applied to the solution or equation for lobe=1 ($k=1$) the solution of this equation would provide a bearing or angle of 70° azimuth. Obviously, the angle 70° does not lie within lobe=1 but rather within lobe=0 or $k=0$. Consequently, the application of this phase measurement to the $k=1$ solution $$\dfrac{(\phi_4+360°)}{720}$$

cannot produce convergence since there is no chronologically-sequential consistency between the computation of the bearing for this measurement and the previous computations for aircraft positions 1, 2 and 3.

Chronological consistency is achieved in the present process by introducing into the different solutions the factor identified as $a$ each time the tracking of the sonobuoy passes through an azimuthal change which involves one of the abrupt discontinuities between the successive lobes of FIG. 5. The factor $a$ therefore represents an algebraic addition to the different solutions amounting to $K\pm360°$ each time a lobe discontinuity is recorded. This factor, of course, is applied to the solutions to modify the solutions and render their bearing computations chronologically consistent and, as will be appreciated, the solutions are modified each time that an abrupt discontinuity is recorded.

The particular advantages of the present process have been considered and, as has been noted they are most apparent when they are compared with prior Sonobuoy Reference Systems which utilize the shorter length arrays to remove the ambiguity from the longer, multi-lambda arrays while also taking advantage of the relative accuracy of the multi-lambda arrays over the shorter arrays. First, from a hardware point of view, the weight, size and complexity of the present system is substantially less than the prior systems since, in the present system, only one longitudinal array is all that is needed. Another significant advantage is that the software requirements for the present system are substantially reduced due to the reduction in the amount or number of array data which the software is required to process. Further, from a tactical point of view, the present process has a distinct advantage since it provides relatively immediate results rather than being dependent upon successively removing ambiguities from shorter to intermediate longer arrays. In addition to these, as well as other improvements which should be rather apparent, the present process materially improves the accuracy of the bearings. Again, however, it should be pointed out that the so-called Sonobuoy Reference System example used in the foregoing description represents only one application of the present process. Obviously, the process is equally applicable to arrays that are tactically stationary, such, for example, as land or sea based as opposed to the aircraft-mounted arrays. Of course, one of the essential steps in the process is to produce relative motion between the array and the signal source. Obviously if the array is land based, it can be rotated or otherwise moved in a controlled manner.

Many modifications and variations of the present invention are possible in the light of the above teachings. It is therefore to be understood that within the scope of the appended claims the invention may be practiced otherwise than as specifically described.

I claim:

1. A process of resolving the ambiguity inherent in the use of target-finding systems employing a target signal-receiving antenna array coupled to a phase meter, said array being a multi-lambda array characterized by the use of at least one pair of antennas having a baseline spacing substantially greater than the wavelength of the target signal, the process comprising the steps of:

establishing theoretically predetermined date relative to the rate at which the phase difference between the antennas of the multi-lambda array varies with a monotonic 360° azimuthal variation in the relative positions of said array and said target, said predetermination inherently provided a plurality of rate of exchange lobes each defining a variation in phase difference between 360° and 0° with each lobe demonstrating an abrupt 360° phase difference discontinuity transition to its next successive lobe, monotonically varying the angular attitude of said array baseline relative to said target, phase tracking said target-signal during a known incremental portion of said angular attitude variation to provide measured phase difference data as well as phase rate-of-change data and lobe discontinuity data, and matching said provided data with said predetermined data, the true bearing of the target signal being determined by degree of consistency between the provided data and the predetermined data.

2. The process of claim 1 wherein said phase tracking is applied to chronologically-successive increments of said attitude variations and said phase difference data provides measurements of the increase and decrease of the phase difference for each increment.

3. The process of claim 2 further including the steps of:

computing all possible angular bearings of said target signal indicated by said provided data, said bearing computations including said lobe discontinuity data for the purpose of maintaining chronologically sequential consistency between said bearing computations.

4. The process of claim 3 wherein said means for computing said possible bearings employs a plurality of solutions each based upon the following equation:

$$\text{Cos}A = \frac{\phi + 2\pi(k \pm a)}{2\pi n}$$

where:

A is a possible bearing angle of the target $\phi$ is a phase measurement k is an integer relating each phase measurement to the possible angular bearings of the target signal, said k having values of $k_o$, ±1, ±2, ±(n −1)

n is the factor by which the baseline length of the array exceeds the wavelength of the received signal and a is an integer representing said lobe discontinuity data.

5. The process of claim 4 wherein said lobe discontinuity data (a) is an integer designating the number of lobe changes occuring during the incremental variation of the target signal and array relative positions.

6. The process of claim 5 wherein said phase tracking data is provided iteratively and with sufficient frequency to statistically substantiate the consistency between true bearing and the predetermined bearing.

7. The process of claim 1 wherein said monotonic variation is accomplished by a relative rotational movement between the array and the target signal, the azimuthal changes produced by said movement being iteratively measured for enabling a determination of the phase rate of change based upon measured data.

8. The process of claim 7 wherein said true bearing is resolved by a rotational movement of no less than 180° and by resolving the relationship −n    a+k    n−1 where:

n is the factor by which the baseline array exceeds the wavelength of the received signal, a is an integer representing said lobe discontinuity data, and k is an integer relating each phase measurement to the possible angular bearings of the target signal.

9. The process of claim 7 wherein right-left aspects of the target are determined by the comparing of the direction of the rotational movement and the manner in which the phase measurements change during the rotational movement.

10. The process of claim 7 wherein the true bearing is resolved by a rotational movement less than 180° and by comparing the measured phase rate of change with the theoretical phase rate of change provided by the relationship;

$$\text{Cos}A = \frac{\phi + 2\pi(k \pm a)}{2\pi n}$$

where:

A is a possible bearing angle of the target $\phi$ is a phase measurement, k is an integer relating each phase measurement to the possible angular bearings of the target signal, said k having values of $k_o$, 1, 2, (n−1)

n is the factor by which the baseline length of the array exceeds the wavelength of the received signal and a is an integer representing said lobe discontinuity data.

* * * * *